(12) United States Patent
Fukuda et al.

(10) Patent No.: US 6,257,515 B1
(45) Date of Patent: Jul. 10, 2001

(54) MAGNETIC RECORDING AND REPRODUCING APPARATUS DETECTING END OF TAPE BY COUNTING MOTOR SIGNALS PER SUPPLY-REEL REVOLUTION

(75) Inventors: Kazunori Fukuda; Kazuo Ueo, both of Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/520,364

(22) Filed: Mar. 7, 2000

(30) Foreign Application Priority Data

Mar. 17, 1999 (JP) .................................................. 11-071953

(51) Int. Cl.$^7$ .................................................. G03B 21/50
(52) U.S. Cl. ...................................... 242/333.7; 360/74.2
(58) Field of Search ............................... 242/333.1, 333.7; 360/74.2

(56) References Cited

U.S. PATENT DOCUMENTS

| | | | |
|---|---|---|---|
| 3,730,453 | * | 5/1973 | Hotchkiss et al. ................. 242/333.7 |
| 3,834,648 | * | 9/1974 | Rose, Jr. et al. .................. 242/333.1 |
| 3,921,220 | * | 11/1975 | Primosch et al. ................. 242/333.7 |
| 4,213,583 | * | 7/1980 | Mitani et al. ...................... 242/333.7 |
| 4,338,645 | * | 7/1982 | Mohri et al. ....................... 242/333.7 |
| 4,352,472 | * | 10/1982 | Tyrsted ............................... 242/333.7 |
| 4,811,132 | * | 3/1989 | Hunter et al. ...................... 242/333.7 |
| 4,866,547 | * | 9/1989 | Rodal et al. ......................... 360/74.2 |
| 5,309,300 | * | 5/1994 | Lee ....................................... 360/74.2 |
| 5,600,504 | * | 2/1997 | Seo ..................................... 242/333.7 |
| 5,659,435 | * | 8/1997 | Han .................................... 242/333.7 |
| 5,801,893 | * | 9/1998 | Miller et al. ........................ 242/333.7 |
| 6,101,309 | * | 8/2000 | Yim et al. ............................ 360/74.2 |

FOREIGN PATENT DOCUMENTS

| | | |
|---|---|---|
| 265234 | 5/1990 | (JP) . |
| 8147818 | 6/1996 | (JP) . |

* cited by examiner

Primary Examiner—Emmanuel M. Marcelo

(57) ABSTRACT

A magnetic recording and reproducing apparatus feeds magnetic tape from a supply reel to a take-up reel driven by a motor. Sensors generate signals responsive to each revolution of the supply reel and to the rotation of the motor. An end-of-tape detector counts the number of motor-sensor signals per revolution of the supply reel, and thereby detects the approaching end of the magnetic tape, so that the motor can be slowed before the end of the tape is reached. A detection threshold may be selected or computed in advance by using information provided by a third sensor, which generates a signal responsive to each revolution of the take-up reel.

14 Claims, 3 Drawing Sheets

MAGNETIC RECORDING AND REPRODUCING APPARATUS DETECTING END OF TAPE BY COUNTING MOTOR SIGNALS PER SUPPLY-REEL REVOLUTION

BACKGROUND OF THE INVENTION

The present invention relates to apparatus for recording and reproducing information on magnetic tape, more particularly to an improved method of detecting the end of the magnetic tape.

Magnetic tape is widely used for recording and reproducing audio and video signals. The operating modes of the recording and reproducing apparatus commonly include a fast-forward mode and a rewind mode, in which the tape is transported at high speed. In these high-speed modes, it is desirable to reduce the tape speed shortly before the end of the tape is reached, to lessen the shock that occurs when tape travel halts abruptly at the end of the tape. For this purpose, it is necessary to detect the approaching end of the tape.

A known detection method is to detect the rotational speeds or periods of the two reels on which the tape is wound, and monitor the ratio between the two speeds or periods. A disadvantage of this method is that it requires the simultaneous monitoring of the rotation of two reels, and repeated ratio calculations.

Some types of tape have a control track on which a control signal with a pulse waveform is recorded. The approaching end of the tape can then be detected by monitoring the number of control pulses per revolution of the supply reel. A disadvantage of this method is that it fails completely if the control signal is missing. Furthermore, even when the control signal is present, individual control pulses may be missing, or may not be picked up, causing the end of the tape to be detected at the wrong place.

SUMMARY OF THE INVENTION

An object of the present invention is to detect the approaching end of a magnetic tape reliably during high-speed tape transport, without having to monitor two separate rotational speeds or periods or calculate a ratio between them.

The invented magnetic recording and reproducing apparatus feeds magnetic tape from a supply reel to a take-up reel driven by a motor. A first sensor generates a first signal indicating each revolution of the supply reel. A second sensor generates a second signal responsive to the rotation of the motor. An end-of-tape detector counts the second signal with reference to the first signal, thereby determining the number of second signals occurring per revolution of the supply reel, and detects the approaching end of the magnetic tape from this number, by comparing the number with a threshold, for example.

To determine the threshold, the apparatus preferably has a third sensor that generates a third signal indicating each revolution of the take-up reel, and a classifier that counts the second signal with reference to the third signal, thereby determining the number of second signals occurring per revolution of the take-up reel.

The end of the tape is detected reliably because detection rests on sensing the revolution of a motor built into the apparatus, instead of sensing control pulses that may or may not be recorded on the tape. During the detection process, only the rotation of the supply reel is monitored, and no ratio calculation is necessary.

DETAILED DESCRIPTION OF THE INVENTION

Figure 1:
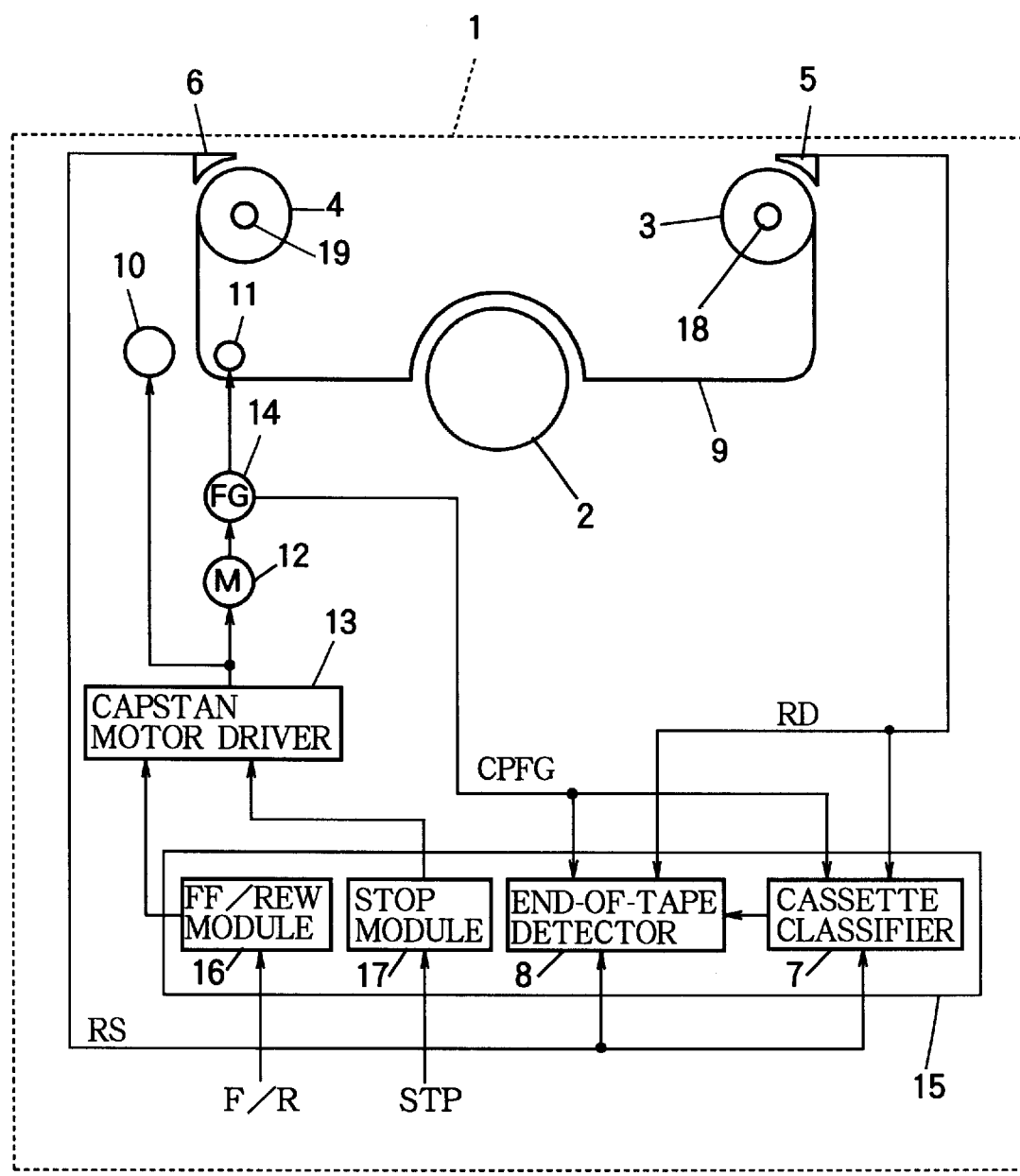
FIG. 1 is a block diagram of an embodiment of the present invention.

A video cassette recorder embodying the invention will be described with reference to the attached drawings, in which like parts are indicated by like reference characters. The drawings are schematic, and do not indicate the actual sizes, shapes, or positional relationships of the illustrated elements.

The embodiment is shown in FIG. 1. The indicated elements are the video cassette recorder 1, its cylinder head 2, a pair of reels 3, 4, a pair of rotational sensors 5, 6, a cassette classifier 7, an end-of-tape detector 8, the magnetic tape 9, a pinch roller 10, a capstan 11, a capstan motor 12, a capstan motor driver 13, a capstan frequency generator 14, a controller 15, a fast-forward/rewind module 16, a stop module 17, and a pair of reel spindles 18, 19. The indicated signals include a sinistral reel revolution signal RS, a dextral reel revolution signal RD, a capstan motor rotation signal or capstan frequency-generator signal CPFG, a fast-forward/rewind command signal F/R, and a stop command signal STP.

The video cassette recorder 1 comprises the cylinder head 2, rotational sensors 5, 6, pinch roller 10, capstan 11, capstan motor 12, capstan motor driver 13, capstan frequency generator 14, controller 15, and reel spindles 18, 19. The cylinder head 2 includes magnetic heads (not visible) that record and reproduce signals on the magnetic tape 9 as the magnetic tape 9 travels around the cylinder head 2, wrapping around the cylinder head 2 at an angle. The controller 15 includes the cassette classifier 7, end-of-tape detector 8, fast-forward/rewind module 16, and stop module 17. The reels 3, 4, and magnetic tape 9 are parts of a magnetic tape cassette.

When the magnetic tape cassette is loaded into the video cassette recorder 1, reel 3 engages spindle 18, and reel 4 engages spindle 19. When the magnetic tape 9 is transported forward, it is unwound from reel 4 and taken up by reel 3. In this situation, reel 4 is the supply reel and reel 3 is the take-up reel. When the tape is transported in the reverse direction, reel 3 becomes the supply reel and reel 4 becomes the take-up reel.

Rotation sensor 5 generates the RD signal by sensing the revolution of reel 3, generating one RD pulse per reel revolution. Similarly, rotation sensor 6 generates the RS signal by sensing the revolution of reel 4, generating one RS pulse per reel revolution. The RD and RS signals are both supplied to the cassette classifier 7 and end-of-tape detector 8. The functions of these signals depend on the direction of tape travel. During forward tape travel, in a fast-forward operation, for example, RS is the first signal, indicating each revolution of the supply reel, and RD is the third signal, indicating each revolution of the take-up reel. During reverse tape travel, in a rewind operation, RD is the first signal, and RS is the third signal.

The pinch roller 10 is movable to a first position adjacent the capstan 11, and a second position more distant from the capstan 11. This motion is effected by a device such as a solenoid (not visible) controlled by the capstan motor driver 13.

The capstan 11 forms the rotational axis of the capstan motor 12, and is driven by the capstan motor 12 under control of the capstan motor driver 13. The capstan motor 12 also drives the take-up reel. In recording and reproducing operations, the capstan motor 12 supplies torque to the take-up reel through a transmission mechanism and slip mechanism (not visible). In fast-forward and rewind operations, the capstan motor 12 drives the take-up reel through a speed-multiplying mechanism (not visible). In a fast-forward operation, the capstan motor 12 drives the spindle 18 of reel 3. In a rewind operation, the capstan motor 12 drives the spindle 19 of reel 4.

The capstan motor driver 13 controls the pinch roller 10 and capstan motor 12 according to signals received from the controller 15, to carry out various operations. The operations of recording and reproducing (at normal speed, slow-motion speed, or fast search speed) are carried out with the pinch roller 10 holding the magnetic tape 9 against the capstan 11, the capstan motor 12 running at a constant rotational speed, and the magnetic tape 9 thus traveling at a constant velocity. Fast-forward and rewind operations are carried out with the pinch roller 10 disengaged from the magnetic tape 9 and capstan 11, the capstan motor 12 running at a constant rotational speed, and the tape traveling at a high but not constant velocity.

The capstan frequency generator 14 generates the CPFG signal by sensing the rotation of the capstan motor 12, generating one CPFG pulse each time the capstan motor 12 turns through a certain angle. The CPFG signal is supplied as the second signal to the cassette classifier 7 and end-of-tape detector 8. When the capstan motor 12 is running at a constant speed, CPFG pulses are generated at regular fixed intervals, proportional to the rotational period of the capstan motor 12. The number of CPFG pulses per revolution of the capstan motor is constant, and for accurate end-of-tape detection, is preferably as large as possible.

The controller 15 controls the operation of the video cassette recorder 1. The cassette classifier 7 recognizes one revolution of the supply reel as the interval between two consecutive first-signal pulses (RS pulses or RD pulses), and counts the number $NP_1$ of CPFG pulses received during each revolution of the supply reel. The cassette classifier 7 also recognizes one revolution of the take-up reel as the interval between two consecutive third-signal pulses (RD pulses or RS pulses), and counts the number $NP_2$ of CPFG pulses received during each revolution of the take-up reel. On the basis of these counts $NP_1$ and $NP_2$, the cassette classifier 7 determines the type of magnetic tape cassette loaded in the video cassette recorder 1, thus determining the hub size of the reels 3, 4, and determines the thickness and total amount of the magnetic tape 9 wound on these reels. The cassette classifier 7 provides this information to the end-of-tape detector 8.

The end-of-tape detector 8 recognizes each revolution of the supply reel from the first signal (RS or RD), and counts the number $NP_1$ of CPFG pulses received during each revolution of the supply reel. From this count $NP_1$ and from the information supplied by the cassette classifier 7, the end-of-tape detector 8 detects the approaching end of the magnetic tape 9. More specifically, the end-of-tape detector 8 detects the approximate instant when a predetermined length or amount of tape remains on the supply reel.

The fast-forward/rewind module 16 receives the F/R command signal, and controls fast-forward and rewind operations. The stop module 17 receives the stop (STP) signal, to which it responds by directing the capstan motor driver 13 to stop the capstan motor 12 and thereby halt tape transport.

The controller 15 is, for example, a microcontroller comprising such well-known facilities (not visible) as a central processing unit, memory, counters, and input/output ports. The cassette classifier 7, end-of-tape detector 8, fast-forward/rewind module 16, and stop module 17 then comprise program code stored in the memory and executed by the central processing unit, making use of the counters and input/output ports.

The two-part process by which the end of the magnetic tape 9 is detected will now be described. The first part of the process is the determination of the cassette type and tape thickness and amount. This part of the process is carried out by the cassette classifier 7 while the magnetic tape 9 travels at a constant velocity. The second part of the process is the end-of-tape detection process. This part of the process is carried out by the end-of-tape detector 8 while the magnetic tape 9 travels at high speed. Both parts of the process are carried out in response to a fast-forward/rewind (F/R) command.

Figure 2:
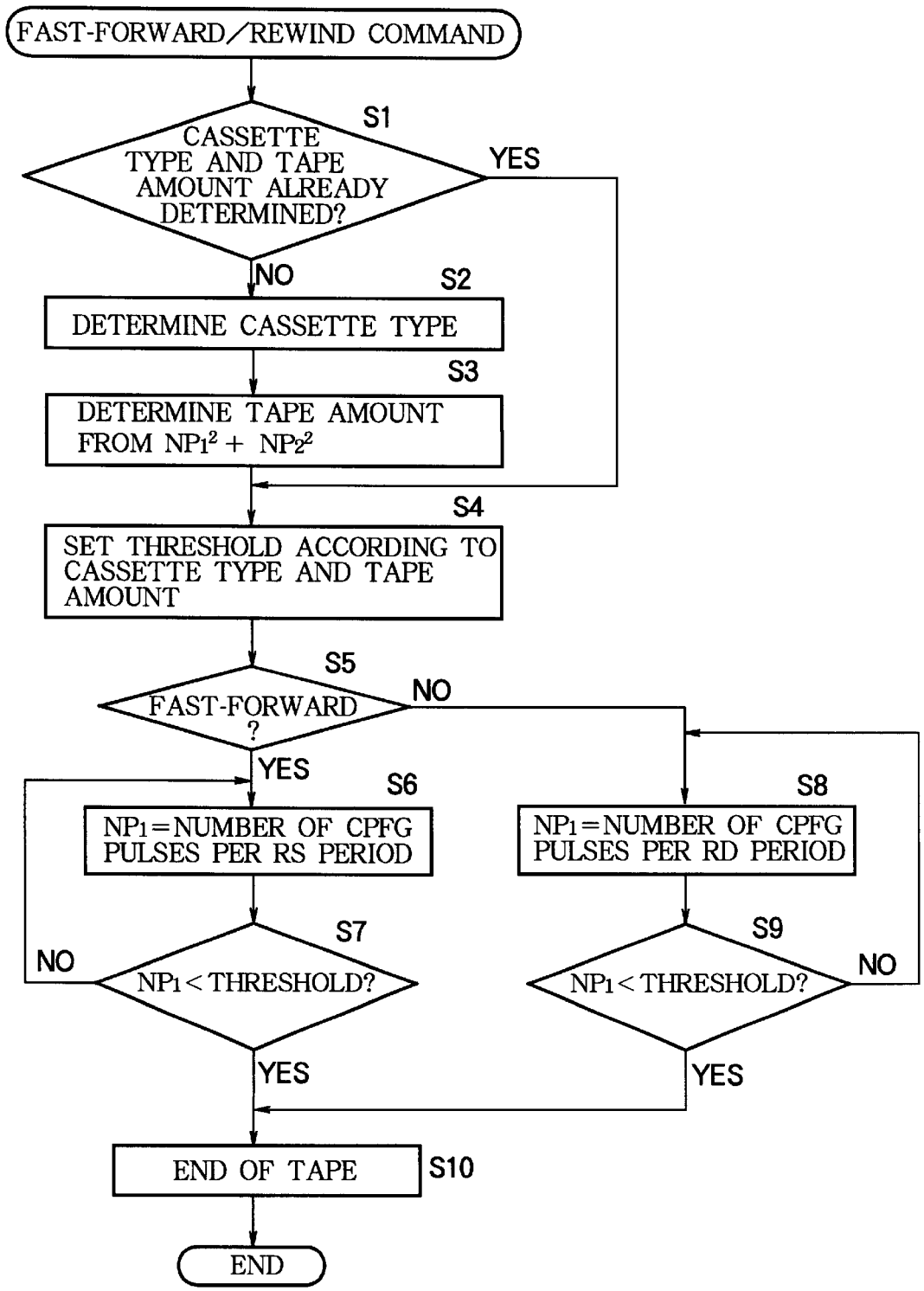
FIG. 2 is a flowchart illustrating the operation of the embodiment.

Referring to FIG. 2, when the fast-forward/rewind module 16 in the controller 15 receives an F/R command, it decides whether the type of cassette now loaded in the video cassette recorder 1 and the tape amount have already been determined (step S1). If the cassette type and tape amount have already been determined, the fast-forward/rewind module 16 directs the capstan motor driver 13 to begin moving the magnetic tape 9 at high speed in the commanded direction, and the process proceeds to step S4. The commanded direction is the forward direction for a fast-forward command, or the reverse direction for a rewind command. If the cassette type and tape amount have not already been determined, the fast-forward/rewind module 16 directs the capstan motor driver 13 to begin moving the magnetic tape 9 at a constant velocity in the commanded direction, and the process proceeds to step S2 to determine the cassette type.

In step S2, the capstan motor driver 13 moves the pinch roller 10 to the position adjacent the capstan 11, so that the magnetic tape 9 is pressed against the capstan 11, and drives the capstan motor 12 at a constant speed, thereby transporting the magnetic tape 9 at a constant velocity. The cassette classifier 7 receives the RS, RD, and CPFG signals, and counts CPFG pulses to determine the above-described numbers $NP_1$ and $NP_2$. Since the CPFG pulses are received at a constant rate, $NP_1$ is proportional to the rotational period of the supply reel, and $NP_2$ is proportional to the rotational period of the take-up reel. These rotational periods vary, depending on how much of the magnetic tape 9 is wound on the supply reel and how much is wound on the take-up reel.

The cassette classifier 7 calculates the sum of the squares of $NP_1$ and $NP_2$ ($NP_1^2+NP_2^2$). The value of this sum of squares does not vary depending on the relative amounts of tape on the two reels 3, 4; it depends only on the hub radius $R_0$ of the reels 3, 4 and the total amount of tape wound on the two reels 3, 4. The total amount of tape is the product of the length L and thickness D of the tape. These parameters ($R_0$, L, D) are sufficiently standardized that by comparing the sum of squares with a set of predetermined thresholds, the cassette classifier 7 is able to recognize the cassette type (for example, type VHS or type VHS-C, these letters denoting standard cassette types with known hub sizes). By recognizing the cassette type, the cassette classifier 7 determines the hub radius $R_0$ exactly.

In step S3, the cassette classifier 7 determines the length L and thickness D of the magnetic tape 9, and the total amount of tape (L×D) wound on the two reels 3, 4. To the extent that the parameters L and D are standardized, they can be determined in the same way as the hub radius $R_0$, by comparing the above sum of squares ($NP_1^2+NP_2^2$) with a set of predetermined thresholds. However, these parameters and the tape amount can also be calculated from $NP_1$ and $NP_2$, as follows.

The total amount of tape (L×D) wound on the two reels 3, 4 is calculated by multiplying the above sum of squares ($NP_1^2+NP_2^2$) by a first constant, and subtracting the square of the hub radius $R_0$ multiplied by a second constant. The value of the first constant depends on the capstan diameter and the number of CPFG pulses generated per capstan revolution.

The tape thickness D is calculated from the value of $NP_2$ measured over 2n successive revolutions of the take-up reel, where n is a positive integer. If $NP_2(0)$ is the value of $NP_2$ in the revolution just completed, and $NP_2(i)$ is the value of $NP_2$ in the i-th preceding revolution, then the following quantities A and B are calculated.

$$A=NP_2(0)+NP_2(1)+\ldots+NP_2(n-1)$$

$$B=NP_2(n)+NP_2(n+1)+\ldots+NP_2(2n-1)$$

The tape thickness is determined by multiplying the difference (A−B) between A and B by a constant that depends on the capstan diameter, the number of CPFG pulses per capstan revolution, and the value of n.

The tape length L is calculated by dividing the tape thickness D into the tape amount (L×D).

The calculated tape length and thickness may be treated as estimated values, and converted to standardized values by comparison with respective thresholds.

At the conclusion of steps S2 and S3, the cassette classifier 7 provides the end-of-tape detector 8 with information indicating the hub size $R_0$, tape amount (L×D), and tape thickness D. The information may comprise the explicit values of these three parameters or, equivalently, the values of the hub radius $R_0$, the tape thickness D, and the above sum of squares ($NP_1^2+NP_2^2$). Alternatively, the information may comprise the values of the hub radius $R_0$, tape length L, and tape thickness D, or codes identifying standard values of these three parameters ($R_0$, L, D). The fast-forward/rewind module 16 now switches from constant-velocity tape transport to high-speed tape transport.

At the beginning of step S4, the capstan motor 12 is running at a constant rotational speed, driving the take-up reel at a constant high rotational speed through the above-mentioned speed-multiplying mechanism. The pinch roller 10 has been moved away from the capstan 11, and the magnetic tape 9 is being transported at high speed from the supply reel to the take-up reel. The end-of-tape detector 8 receives the RS, RD, and CPFG signals.

In step S4, the end-of-tape detector 8 selects a threshold according to the information provided by the cassette classifier 7. A standard threshold is predetermined for each standard cassette type and standard tape length (or amount) and thickness. The standard threshold values are stored in a memory area (not visible) in the controller 15. The end-of-tape detector 8 selects the appropriate threshold from the information supplied by the cassette classifier 7. The threshold corresponds to the rotational period of the supply reel at the instant when the above-mentioned predetermined length or amount of tape is left on the supply reel.

In step S5, the process branches to step S6 if the F/R command was a fast-forward command, and to step S8 if the F/R command was a rewind command.

If the F/R command was a fast-forward command, then in step S6, the end-of-tape detector 8 obtains the current value of $NP_1$, the number of CPFG pulses received per revolution of the supply reel, by counting the number of CPFG pulses from one RS pulse to the next. In step S7, the end-of-tape detector 8 compares $NP_1$ with the threshold selected in step S4. If $NP_1$ is equal to or greater than the threshold, the end-of-tape detector 8 returns to step S6 to obtain a new value of $NP_1$.

If the F/R command was a rewind command, then in step S8, the end-of-tape detector 8 obtains the current value of $NP_1$ by counting the number of CPFG pulses from one RD pulse to the next. In step S9, the end-of-tape detector 8 compares $NP_1$ with the threshold selected in step S4. If $NP_1$ is equal to or greater than the threshold, the end-of-tape detector 8 returns to step S8 to obtain a new value of $NP_1$.

During steps S6 and S7, or S8 and S9, the capstan motor 12 continues to run at a constant speed. The interval between CPFG pulses thus remains constant, and the rotational period of the take-up reel also remains constant. The velocity of the magnetic tape 9 increases as more and more tape is taken up. The rotational speed of the supply reel also increases, both because the tape speed is increasing, and because less and less tape is left on the supply reel. The rotational period of the supply reel and the number $NP_1$ therefore decrease as the operation proceeds. At some point, $NP_1$ falls below the threshold, indicating that the end of the tape is approaching, and the process proceeds from step S7 or S9 to step S10.

In step S10, the end-of-tape detector 8 informs the fast-forward/rewind module 16 that the end of the tape has been detected, completing the end-of-tape detection process. The fast-forward/rewind module 16 now directs the capstan motor driver 13 to reduce the speed of the capstan motor 12, thereby lessening the shock that occurs when the end of the tape is reached.

The process in steps S4 to S10 monitors the rotational period of only the supply reel, so the computational load is lighter than in conventional processes that monitor the rotation of both reels and calculate a ratio.

It is also an advantage that no clock signal is needed to measure the rotational period of the supply reel, since the CPFG pulses, which are generated at a constant rate, serve the same purpose.

No use of a control signal recorded on the tape is made in any of steps S1 to S10. Accordingly, the end of the tape is detected reliably even if the control signal is missing.

In step S4, the threshold is selected on the basis of the tape thickness D, as well as the hub radius $R_0$ and tape length L. The approaching end of the tape can accordingly be detected with higher precision than if only the hub radius and tape length were to be considered.

In a variation of the above embodiment, steps S2 and S3 are performed when the tape is wound substantially entirely on the supply reel, and the cassette type is determined by comparing $NP_1$ with one or more predetermined thresholds. Alternatively, the cassette type and tape amount are determined by comparing $NP_2$ with a set of predetermined thresholds.

In another variation, the tape amount (L×D) is determined in step S3 by applying a known formula (disclosed in Japanese Unexamined Patent Application No. 8-147818) involving the hub radius $R_0$ the rotational periods of the two reels 3, 4, and the tape velocity VT. The rotational periods of the two reels 3, 4 are obtained from $NP_1$ and $NP_2$. The tape velocity VT is obtained from the rate at which CPFG pulses are received.

These alternative methods can be used singly or in combination with each other, or in combination with the sum-of-squares method. Still other methods are available, such as methods employing the tape displacement, which is calculated from the supply-reel pulse count as the tape moves forward, the motor speed, and the number of pulses output per motor revolution.

In yet another variation, in step S4, the appropriate threshold is calculated mathematically from the information ($R_0$, L, D) supplied by the cassette classifier 7, instead of being selected from among a set of standard thresholds.

In still another variation, to shorten step S3, the cassette classifier 7 only determines the total tape amount (L×D), without determining the tape length and thickness. This information still enables an appropriate threshold to be selected, although with less precision than if the tape thickness (D) were to be considered.

Figure 3:
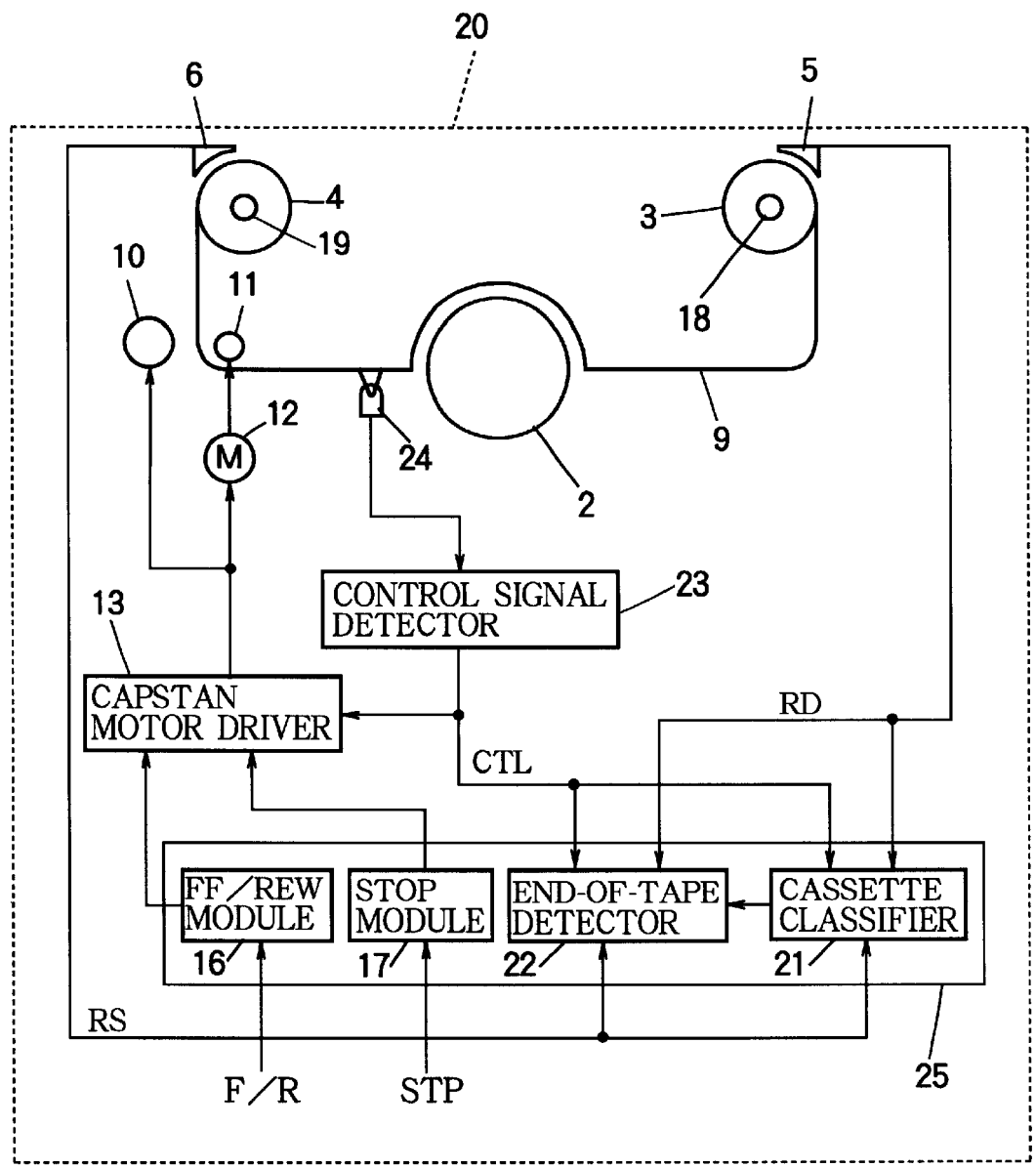
FIG. 3 is a block diagram illustrating the prior art.

For comparison with the embodiment above, FIG. 3 shows a conventional video cassette recorder 20, in which the cassette classifier 21 and end-of-tape detector 22 use a control signal (CTL) reproduced from the magnetic tape 9 to identify the cassette type and detect the end of the tape. The control signal is a pulse signal comprising, for example, one pulse per video data frame. The control signal is obtained by a control signal detector 23 from a control head 24, which scans a control track on the magnetic tape 9. The control signal (CTL) is supplied both to the capstan motor driver 13, for fine adjustment of the speed of the capstan motor 12, and to the controller 25. The cassette classifier 21 and end-of-tape detector 22 do not receive information about the rotation of the capstan motor 12, and no use is made of a capstan frequency generator or CPFG signal.

Other than these differences, the configuration of the video cassette recorder 20 is similar to the configuration shown in FIG. 1. In particular, the RS and RD signals are the same.

The cassette classifier 21 counts the number $NT_1$ of control (CTL) pulses per revolution of the supply reel and the number $NT_2$ of control pulses per revolution of the take-up reel, these revolutions being indicated by the RS and RD signals. The cassette classifier 21 identifies the cassette type by comparing the sum of the squares of these two counts ($NT_1^2+NT_2^2$) with a set of predetermined threshold values.

The end-of-tape detector 22 counts the number $NT_1$ of control pulses per revolution of the supply reel during high-speed operations, and compares this count with a threshold that is predetermined for each type of cassette, detecting the end of the tape when the count goes below the threshold.

The conventional video cassette recorder 20 thus relies on the control signal CTL both to identify the cassette type and to detect the end of the tape, and is unable to perform these operations when the control signal is missing. For example, the conventional video cassette recorder 20 is unable to detect the end of a blank magnetic tape on which nothing is recorded.

The invention has been described in relation to a video cassette recorder, but can be practiced in other types of magnetic tape recording and reproducing apparatus, including audio apparatus.

Those skilled in the art will recognize that further variations are possible within the scope claimed below.

What is claimed is:

1. A magnetic recording and reproducing apparatus feeding a magnetic tape from a supply reel to a take-up reel, comprising:
   a first sensor generating a first signal indicating each revolution of the supply reel;
   a motor driving the take-up reel;
   a second sensor coupled to the motor, generating a second signal at a rate responsive to rotation of the motor; and
   an end-of-tape detector coupled to the first sensor and the second sensor, counting the second signal with reference to the first signal, thereby obtaining a first number indicating occurrences of the second signal per revolution of the supply reel and detecting an instant at which a predetermined amount of the magnetic tape is left on the supply reel.

2. The apparatus of claim 1, wherein the end-of-tape detector detects said instant by comparing the first number with a threshold.

3. The apparatus of claim 2, further comprising:
   a third sensor generating a third signal indicating each revolution of the take-up reel; and
   a classifier coupled to the third sensor, counting the second signal with reference to the third signal, thereby obtaining a second number indicating occurrences of the second signal per revolution of the take-up reel, using the second number to obtain information indicating a hub size of the supply reel and a total amount of the magnetic tape wound on the supply reel and the take-up reel, and providing said information to the end-of-tape detector;

wherein the end-of-tape detector determines said threshold according to said information.

4. The apparatus of claim 3, wherein the classifier also determines a thickness of the magnetic tape, and includes said thickness in said information for use by the end-of-tape detector in determining said threshold.

5. The apparatus of claim 3, wherein the classifier also uses the first number in obtaining said information.

6. The apparatus of claim 3, wherein the end-of-tape detector selects said threshold from a set of predetermined thresholds.

7. The apparatus of claim 3, wherein the end-of-tape detector calculates said threshold from the information provided by the tape classifier.

8. A method of detecting the end of a magnetic tape fed from a supply reel to a take-up reel in a magnetic recording and reproducing apparatus, comprising the steps of:

(a) generating a first signal indicating each revolution of the supply reel;

(b) generating a second signal at a rate responsive to rotation of a motor driving the take-up reel;

(c) counting the second signal with reference to the first signal, thereby obtaining a first number indicating occurrences of the second signal per revolution of the supply reel; and (d) using the first number to detect an instant at which a predetermined amount of the magnetic tape is left on the supply reel.

9. The method of claim 8, wherein said step (d) includes comparing the first number with a threshold.

10. The method of claim 9, further comprising the steps of:

(e) generating a third signal indicating each revolution of the take-up reel;

(f) counting the second signal with reference to the third signal, thereby obtaining a second number indicating occurrences of the second signal per revolution of the take-up reel;

(g) using the second number to obtain information indicating a hub size of the supply reel and a total amount of tape on the supply reel and the take-up reel; and (h) determining said threshold from said information.

11. The method of claim 10, further comprising the step of using the second number to determine a thickness of the magnetic tape, said thickness being included in the information used to determine said threshold in said step (h).

12. The method of claim 10, wherein the first number is also used in obtaining said information in said step (g).

13. The method of claim 10, wherein said step (h) comprises the further step of selecting said threshold from a set of predetermined thresholds.

14. The method of claim 10, wherein said step (h) comprises the further step of calculating said threshold from said information.

* * * * *